US009905857B1

(12) United States Patent
Gross et al.

(10) Patent No.: US 9,905,857 B1
(45) Date of Patent: Feb. 27, 2018

(54) METHODS OF FABRICATING METAL-FOAM ELECTRODES FOR BATTERIES AND FUEL CELLS

(71) Applicant: HRL Laboratories, LLC, Malibu, CA (US)

(72) Inventors: Adam F. Gross, Santa Monica, CA (US); John Wang, Los Angeles, CA (US); Andrew P. Nowak, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 162 days.

(21) Appl. No.: 15/067,297

(22) Filed: Mar. 11, 2016

Related U.S. Application Data

(62) Division of application No. 14/304,931, filed on Jun. 15, 2014, now Pat. No. 9,337,493, which is a division of application No. 12/963,632, filed on Dec. 9, 2010, now Pat. No. 8,785,079.

(51) Int. Cl.
*H01M 4/80* (2006.01)
*C25D 3/38* (2006.01)
*C25D 5/16* (2006.01)
*H01M 4/74* (2006.01)

(52) U.S. Cl.
CPC .............. *H01M 4/808* (2013.01); *C25D 3/38* (2013.01); *C25D 5/16* (2013.01); *H01M 4/745* (2013.01)

(58) Field of Classification Search
CPC .......... H01M 4/745; H01M 4/808; C25D 3/38
USPC ......................................... 429/209, 235, 242
See application file for complete search history.

(56) References Cited

U.S. PATENT DOCUMENTS

2006/0292448 A1    12/2006   Gyenge et al.

FOREIGN PATENT DOCUMENTS

WO    2010138138 A1    12/2010

OTHER PUBLICATIONS

"Oxygen reduction in nanoporous metal—ionic liquid composite electrocatalysts," Snyder, Fujita, Chen and Erlebacher, Nature Materials, vol. 9, Nov. 2010, pp. 904-907.

*Primary Examiner* — Basia A Ridley
*Assistant Examiner* — James M Erwin
(74) *Attorney, Agent, or Firm* — O'Connor & Company

(57) ABSTRACT

This invention provides metal-foam electrodes for batteries and fuel cells. In some variations, an electrode includes a first metal layer disposed on a second metal layer, wherein the first metal layer comprises an electrically conductive, open-cell metal foam with an average cell diameter of about 25 µm or less. The structure also includes smaller pores between the cells. The electrode forms a one piece monolithic structure and allows thicker electrodes than are possible with current electrode-fabrication techniques. These electrodes are formed from an all-fluidic plating solution. The disclosed structures increase energy density in batteries and power density in fuel cells.

12 Claims, 11 Drawing Sheets

METHODS OF FABRICATING METAL-FOAM ELECTRODES FOR BATTERIES AND FUEL CELLS

PRIORITY DATA

This patent application is a divisional application of U.S. patent application Ser. No. 14/304,931, filed Jun. 15, 2014 (now allowed), which in turn is a divisional application of U.S. Pat. No. 8,785,079, issued Jul. 22, 2014, each of which is hereby incorporated by reference herein in its entirety.

FIELD OF THE INVENTION

The present invention generally relates to improved electrical-current collectors for batteries, fuel cells, and other energy-storage and energy-delivery devices.

BACKGROUND OF THE INVENTION

Meeting the energy needs of humans in a sustainable manner is a global challenge. Storage and conversion of energy become increasingly relevant as we move towards greater reliance on renewable or non-traditional energy sources. Devices to store and deliver electricity, in particular, need to be able to efficiently convert chemical energy into electrical energy. Batteries and fuel cells are commercial examples of such devices that are in widespread use today, and that are expected to rise in importance as energy technologies in the future.

Batteries and fuel cells both currently suffer from relatively low energy densities, i.e. the quantity of energy (or power) that can be delivered to a user relative to the weight of the device. Higher power densities in batteries and fuel cells enable longer duration intervals between recharging and increased processing power for portable electronic devices. Furthermore, improved power densities would enable increased-range electric vehicles and distributed energy storage.

Improved power density for batteries can in principle be achieved by making thicker electrodes that contain a larger layer of energy-storage material for batteries. However, these approaches have not been successful. Thick battery materials tend to crack under repeated cycling, which electrically isolates the energy storage material and decreases battery capacity. Additionally, conventional electrodes in current state-of-art battery systems such as lithium-ion batteries comprise a film pressed onto a metal foil current collector. The film is typically formed from a polymer binder, conductive agents such as carbonaceous materials, and active materials. The active material loadings or the thickness of the electrode film is restricted due to the internal resistance increase of the film.

Improved energy density for fuel cells can in principle be achieved by introducing more carbon which yields greater surface area for fuel-cell electrodes. Fuel-cell electrodes are typically made of a compressed powder (carbon particles for conductivity, a catalyst, and a polymer binder) which becomes insufficiently conductive as the electrode thickness increases and the electrons must cross multiple high-resistance carbon particle boundaries. As the electrode is made thicker, the resistance increases and eventually the additional electrode material will lose electrical contact with the current carrier.

In light of these and other shortcomings in the art, improved electrodes are needed for both batteries and fuel cells, to overcome electrode thickness limitations in the art.

What is needed is to reduce internal resistance so that thicker and more-efficient electrodes may be fabricated. Improved electrodes are desired to increase energy density and power density, improve heat management, and increase device lifetimes for batteries as well as fuel cells.

SUMMARY OF THE INVENTION

The present invention addresses the aforementioned needs in the art, as will now be summarized and then further described in detail below.

In some variations, this invention provides an electrode comprising a first metal layer disposed on a second metal layer, wherein the first metal layer comprises a non-reticulated, electrically conductive metal foam with an average cell diameter of about 25 μm or less. The metal foam may have an open-cell configuration. In some embodiments, the average cell diameter of the metal foam is from about 0.1 μm to about 10 μm. The cell structure may include smaller pores with an average pore size of about 1 μm or less, such as about 10 nm to about 100 nm.

In some embodiments, the first metal layer and the second metal layer have a structurally continuous interface between the metal layers. The first metal layer may have a thickness of at least 5 μm. The first metal layer may be thick due to the network of electrical connections in the metal foam. The metal foam may have an electrical conductivity of from about 0.001 S/cm to about $10^5$ S/cm, such as about 0.1 to about 10 S/cm.

In some embodiments, the first metal layer comprises one or more metals selected from the group consisting of Cu, Ni, Au, Ag, Al, Sn, Cr, Zn, Ti, Co, Pt, Mn, Fe, V, Pd, W, Nb, Ta, Ru, and combinations and alloys thereof. Optionally, the first metal layer and the second metal layer may contain at least one common metal, or even include the same metal composition.

Some variations of this invention disclose a method of fabricating an electrically conductive metal foam, the method comprising:

(a) providing or receiving a metal-ion solution comprising a polar solvent and at least one selected metal ion or salt thereof;

(b) providing or receiving at least one non-polar fluid;

(c) combining the metal-ion solution with the non-polar fluid to form an emulsion, wherein the metal-ion solution is a continuous phase and the non-polar fluid is a dispersed phase of the emulsion; and (d) immersing a base metal layer into the emulsion under effective conditions for electrodeposition of at least a portion of the metal ions onto the base metal layer, thereby forming the metal foam onto the base metal layer, wherein pore dimensions of the metal foam are templated by droplets contained in the emulsion.

In some embodiments, the metal-ion solution contains one or more metal salts selected from the group consisting of $CuSO_4$, $Cu(NO_3)_2$, $NiSO_4$, and $Ni(NO_3)_2$. In some embodiments, the metal-ion solution contains one or more acids or bases selected from the group consisting of $H_2SO_4$, $HNO_3$, HCl, $Cu(OH)_2$, $Ni(OH)_2$, NaOH, KOH, and $NH_3$.

The non-polar fluid may be selected, for example, from the group consisting of a hydrocarbon, a fluorocarbon, a siloxane, and any combination thereof. In some embodiments, the non-polar fluid includes silicone oil. The dispersed phase may constitute about 1 wt % to about 99 wt %, preferably at least 50 wt %, of the emulsion.

In preferred embodiments, the emulsion further includes an emulsifier selected from surfactants, high-molecularweight polymers, or inorganic particles. The emulsifier may be a surfactant selected from cationic, anionic, or nonionic surfactants. In some embodiments, the surfactant is selected from the group consisting of sodium dodecyl sulfate, dodecylbenzene sulfonate sodium salt, cetyl pyridinium chloride, Triton X-100, and any combination thereof.

Some embodiments employ an emulsifer that is a high-molecular-weight polymer selected from the group consisting of poly(vinyl pyrolidone), poly(vinyl alcohol), poloxamers, carboxymethyl cellulose, hydroxypropyl cellulose, poly(acrylic acid), and poly(ethylene glycol), and any combination thereof. These or other embodiments employ one or more Pickering agents as emulsifiers.

Certain embodiments further comprise reactive crosslinking of the non-polar fluid, to increase viscosity of the dispersed phase. Specific synthetic strategies to accomplish this goal include free-radical addition polymerization, hydrosilation chemistry, and more generically, condensation of multifunctional chemical species with reactive groups on the non-polar fluid.

The metal-ion deposition may be accomplished by electroplating, electrophoretic deposition, underpotential deposition, or electroless deposition. Electroplating may utilize one or more techniques such as galvanostatic, potentiostatic, cyclic-voltammetric, or pulse-current.

These methods may include adjusting cell dimensions, adjusting pore dimensions, or separately adjusting cell and pore dimensions, by varying the properties of the dispersed phase as described herein. In some embodiments, the resulting metal foam has an average cell diameter of about 25 µm or less and/or an average pore size of about 1 µm or less. Preferably, the electrodeposition forms a structurally continuous interface between the metal foam and the base metal layer.

In some variations, this invention provides a battery (such as a lithium-ion battery) comprising an electrode that includes a non-reticulated, electrically conductive metal foam, wherein the metal foam includes cells having an average cell diameter of about 25 µm or less (such as about 0.1-10 µm). The cells contain an energy-storage material for the battery reactions. Pores that are smaller than the cells may also contain the energy-storage material in the battery electrode metal foam. The smaller pores may have an average pore size of about 1 µm or less, such as about 10-100 nm, in some embodiments. Preferably, the metal foam is structurally continuous with a base metal layer that can conduct electrons into and out of the battery.

In other variations, this invention provides a fuel cell comprising an electrode that includes a non-reticulated, electrically conductive metal foam, wherein the metal foam includes cells having an average cell diameter of about 25 µm or less. The cells allow fluid transport of one or more gases, liquids, or dissolved ions in the fuel cell. The average cell diameter of the metal foam may be from about 1 µm to about 20 µm, in some embodiments. Smaller pores may also be present and also allow fluid transport. Preferably, the metal foam is structurally continuous with a base metal layer that can conduct electrons out of the fuel cell. In some embodiments, the metal foam comprises one or more metals that are catalytically active. In these or other embodiments, the metal foam further comprises one or more catalysts, supported on the metal foam, selected from the group consisting of Pt, Co, Cu, Zn, Al, Mo, Se, Ti, V, Mn, Cr, Fe, Ni, Cu, Zn, Sn, Ru, Ta, Nb, Os, Bi, Rh, W, Pb, Au, Pd, and combinations and alloys thereof.

DETAILED DESCRIPTION OF EMBODIMENTS OF THE INVENTION

Figure 1A:
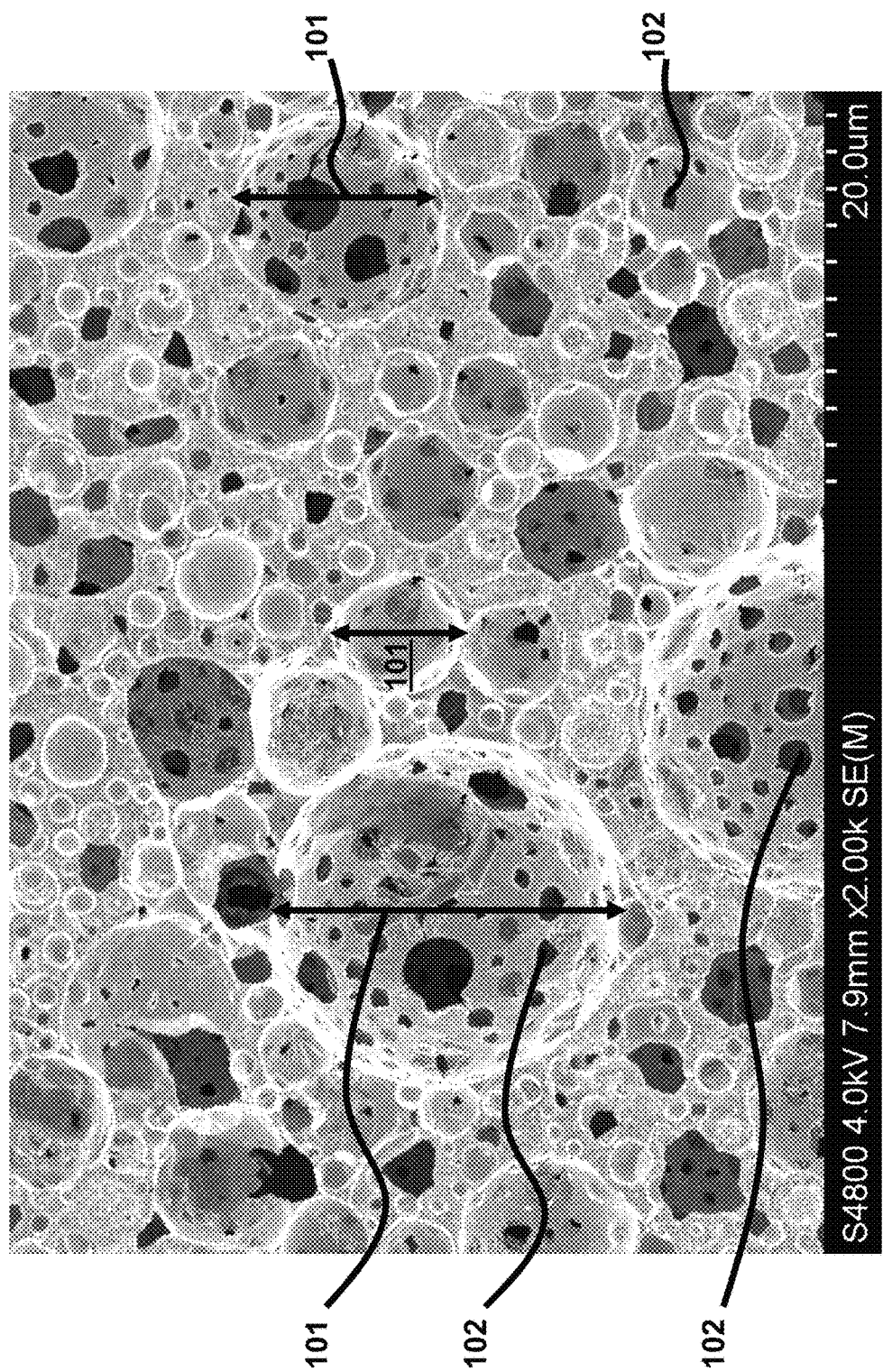
FIG. 1A shows an exemplary SEM image of a metal foam, depicting cells templated by oil droplets, with pores between adjacent cells.

The apparatus, devices, systems, and methods of the present invention will be described in detail by reference to various non-limiting embodiments of the invention.

Unless otherwise indicated, all numbers expressing dimensions, capacities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

As used in this specification and the appended claims, the singular forms "a," "an," and "the" include plural referents unless the context clearly indicates otherwise.

In some variations, this invention utilizes an electrically conductive metal foam. Some variations relate to an electrode comprising a first metal layer disposed on a second metal layer, wherein the first metal layer comprises an electrically conductive metal foam.

A "metal foam" is only intended to mean that the metal is porous, i.e., a significant fraction of the volume consists of void spaces (or spaces filled with another material, when the metal foam is employed in a device). The porosity of the metal foam is not especially limited but may be at least 50%, 60%, 70%, 80%, 90%, or more, in various embodiments of the metal foam.

As used herein, an "electrode" should not be construed as limiting in any way, and is meant to include any collector or emitter of electrical charge or electric-charge carriers. Electrodes described herein may be of any one-dimensional, two-dimensional, or three-dimensional geometrical configuration, and may be employed in any electrical, electrochemical, photovoltaic, or other energy devices, including batteries and fuel cells. The electrode may be either the cathode or the anode in various embodiments and devices.

The electrically conductive metal foam includes at least two relevant length scales within the metal foam. The first length scale is associated with cells within the metal foam, where the walls of the cells are formed from the metal itself. The second length scale is associated with pores within the walls of the cells, allowing fluid passage between at least some cells. The pores can also be referred to as openings or "windows" between cells. The pores are smaller than the cells. (An analogy is a Wiffle ball; the ball is like a cell and the holes in the ball are like the pores.)

The electrically conductive metal foam is not reticulated. A "reticulated foam" is a continuously connected, open-celled foam. In a reticulated foam, there are no windows or openings between cells; there are continuously solid cell walls. By contrast, the metal foam of the invention is a non-reticulated foam. As intended herein, a "non-reticulated" foam means that there is at least a portion of the foam that is not reticulated. Preferably, all of the metal foam will be non-reticulated. Generally speaking, there is on average at least one opening (pore) per cell. Typically, in a non-reticulated metal foam of the invention, there will be multiple pores per cell. However, not every cell needs to contain openings; there may be individual cells within a non-reticulated metal foam that do not contain any openings (pores). In some embodiments, the metal foam can be characterized as a non-reticulated open-cell configuration, or a non-reticulated partially open-cell configuration.

In some embodiments, the metal foam further includes a third length scale associated with the size of metal particles that comprise the walls of the cells, or the size of micropores between these metal particles. If desired, a structure may be characterized by a third length scale associated with the size of metal particles that comprise the walls of the cells and a fourth length scale associated with the size of micropores between these metal particles. Note that the length scale associated with the metal particles is not necessarily smaller than the length scale of the pores, depending on how the metal particles are formed.

All references to cells, pores, and micropores should be construed to include any openings, cavities, or voids of any geometry. The "size" or "diameter" of a pore or cell may refer to any characteristic dimension, including diameter, effective diameter, apparent diameter, length, and tortuous length. For example a cell may be elliptical, in which case the diameter may be the major diameter, minor diameter, or an average diameter.

Pore or cell sizes may be characterized herein in many ways, including by average overall pore size, average size within a class of pores, peak in overall pore-size distribution, or peak in distribution of pore sizes within a certain class or classes of pores. In a symmetric pore-size distribution, the average pore size will be the same as a peak in the pore-size distribution, but many types of pore-size distributions are possible in this invention.

In some variations, the electrically conductive metal foam has a multimodal pore-size distribution, such as a bimodal pore-size distribution with two distinct peaks in the pore size. The distinct pore sizes arise because the structure comprises a plurality of interpenetrating metal particles of varying sizes. Smaller interpenetrating particles may be located within larger particles or domains (e.g., approximately spherical domains), to connect two adjacent particles or domains.

The electrically conductive metal foam, in some embodiments, has an average cell diameter of 100 μm or less, such as 50 μm or less, or 25 μm or less. In certain embodiments, the average cell diameter of the metal foam is from about 0.1 μm to about 10 μm, such as about 0.5, 1, 2, 3, 4, 5, 6, 7, 8, or 9 μm. Or, the pore-size distribution may have a peak at or near 25 μm or less, such as at or near 0.5, 1, 2, 3, 4, 5, 6, 7, 8, or 9 μm.

The average pore size, in some embodiments, is about 1 μm or less. In certain embodiments, the average pore size is from about 10 nm to about 100 nm. Or, the pore-size distribution may have a peak at or near 1 μm or less, such as 10 nm to 100 nm. In other embodiments, the average pore size is greater than 100 nm, but less than the average cell diameter. The composition and fabrication method of the cell walls will generally influence the extent (number) of pore openings between cells. Methods and compositions are discussed herein below.

The average micropore size, in some embodiments, is about 100 nm or less, such as 10 nm or less. In certain embodiments, the average micropore size is less than about 2 nm, including about 1 nm or less. Or, the pore-size distribution may have a peak at or near 100 nm or less, such as 10 nm, 2 nm, 1 nm, or less.

In some embodiments, the foam metal has a bimodal pore-size distribution from cells with a peak in the pore-size distribution at less than 25 μm and from pores with a peak in the pore-size distribution at less than 1 μm. In certain embodiments, the foam metal has a bimodal pore-size distribution from cells with a peak in the pore-size distribution at greater than 500 nm, 1 μm, 2 μm, 5 μm, or 10 μm, and from pores with a peak in the pore-size distribution at less than 500 nm, 400 nm, 300 nm, 200 nm, or 100 nm. In some embodiments, a bimodal pore-size distribution is characterized by a ratio of cell diameter to pore (cell opening) size of from about 3 to about 10, such as about 4 or 5.

In some embodiments, the metal foam has a trimodal pore-size distribution from cells with a peak in the pore-size distribution at greater than 500 nm, from a porous material with a peak in the pore-size distribution between 2 and 100 nm making up the cell walls, and from a microporous material making up the walls of the cells and pores, with a peak in the pore-size distribution at less than 2 nm.

The metal foam should be electrically conductivity, although the electrical conductivity need not be particularly high. In some embodiments, the metal foam has an electrical conductivity (at 25° C.) from about 0.001 S/cm to about $10^5$ S/cm or more, such as from about 0.1 S/cm to about 10 S/cm. The electrical conductivity of the metal itself may be much higher than the electrical conductivity of the metal foam, whose conductivity generally drops with increasing porosity of the foam.

Because the metal foam is a continuous network, allowing for the conduction of electrons over significant length scales, the first metal layer may be fairly thick. For example, the first metal layer may have a thickness of at least 5 μm. In some embodiments, the thickness of the first metal layer is at least 10 μm, 50 μm, 100 μm, or 500 μm. There is no theoretical limit to the thickness of the first metal layer, and in principle electrodes are possible with thicknesses of 1 mm, 1 cm, or even higher.

In some embodiments, the metal foam (in the first metal layer of the electrode) comprises one or more metals selected from the group consisting of Cu, Ni, Au, Ag, Al, Sn, Cr, Zn, Ti, Co, Pt, Mn, Fe, V, Pd, W, Nb, Ta, Ru, and combinations and alloys thereof. The metal(s) selected for the metal foam may be chemically inert under the intended electrode environment, or may be chemically reactive (e.g., catalytically active) in the electrode environment. The metal foam may include various non-metals, such as carbon, hydrogen, oxygen, or nitrogen. Non-metals contained in the metal foam may be present intentionally or unintentionally (i.e., due to impurities during processing).

The second metal layer should be electrically conductive so that electrons can flow into or out of the electrode. In some embodiments, the second metal layer has an electrical conductivity (at 25° C.) on the order of from $10^3$ S/cm to $10^6$ S/cm.

The second metal layer may include one or more metals selected from the group consisting of Cu, Ni, Au, Ag, Al, Sn, Cr, Zn, Ti, Co, Pt, Mn, Fe, V, Pd, W, Nb, Ta, Ru, and combinations and alloys thereof. Any conducting metal may be employed in the second metal layer. Additionally, various non-metals may be present, such as carbon, phosphorous, nitrogen, and so on. Non-metals may be present to form alloys, or due to impurities, for example.

Preferably, the first metal layer and second metal layer form a structurally continuous interface. By "structurally continuous," it is meant that there are little or no gaps, voids, or physical discontinuities. Continuous paths allow collected electrons to flow from the metal foam into the second metal layer. This is beneficial to avoid reduction in electrical conductivity at the interface between the two metal layers. When the metal foam is electrochemically grown directly on a metal foil, for example, the contact resistance in the electrode is believed to reduced relative to an electrode wherein the two metal layers are not structurally continuous (e.g., pressed against each other).

In some embodiments, the interface is also chemically continuous. That is, the metal(s) used in the second metal layer may be the same as the metal(s) used in the first metal layer, but this is by no means necessary. In some embodiments, the two metal layers include at least one common metal.

The second metal layer should not be limited to any particular geometry, and is not required to be a two-dimensional configuration. For example, the second metal layer may take the form of a foil, wire, rod, slab, tab, metal mesh, perforated metal, metallized plastic film, metal grid, or metal wool.

Exemplary methods of fabricating the metal foam will now be described. These methods, along with the accompanying examples, should not be construed to limit the invention in any way.

In some variations, the metal foam can be formed by electrodepositing metal ions onto a metal foil (or other suitable metal layer) immersed in an emulsion. An emulsion is a mixture of two or more immiscible liquids, such as oil and water. An emulsion includes a continuous phase, also referred to as an external phase, and a dispersed phase, also referred to as an internal phase.

The continuous phase of the emulsion may include (or in some embodiments, consist essentially of) a metal-ion solution. The metal-ion solution contains one or more metal ions, or salts thereof, selected to attain a desired composition of the metal foam. The metal-ion solution should include a polar solvent, preferably water (i.e., an aqueous solution).

The polar metal-ion solution preferably contains one or more metals salts, optionally with an acid and/or base to adjust the solution pH value and increase the conductivity of the solution. In certain embodiments, one or more of the metal salts are selected from the group consisting of $CuSO_4$, $Cu(NO_3)_2$, $NiSO_4$, and $Ni(NO_3)_2$. Exemplary acids to reduce the solution pH include $H_2SO_4$, $HNO_3$, and HCl. Exemplary bases to increase the solution pH include $Cu(OH)_2$, $Ni(OH)_2$, NaOH, KOH, and $NH_3$.

The dispersed (internal) phase of the emulsion should consist of one or more non-polar fluids, such as hydrophobic liquids. Exemplary non-polar fluids for the dispersed phase include, but are not limited to, hydrocarbons, fluorocarbons, and siloxanes. Siloxanes include silicone oils, such as polydimethylsiloxane, and may be inert or reactive (e.g., for polymerization or crosslinking reactions). The dispersed phase may range from about 1 wt % to 99 wt %, preferably from about 50 wt % to about 90 wt %, such as about 60, 65, 70, 75, or 80 wt % in the emulsion.

An emulsifier is preferably employed to stabilize the emulsion. An "emulsifier" as intended herein includes any additive to enhance the kinetic stability of the emulsion phase interface. Examples are surfactants, high-molecular-weight polymers, and inorganic particles known as Pickering agents. While emulsifiers are not strictly required, effective emulsifiers will enhance the lifetime of the emulsion. The continuous and dispersed phases could be blended under high shear, but the rest of the method would need to be carried out rather quickly before the two phases coalesce.

In some embodiments, the emulsifier is a surfactant. Possible surfactants are cationic, anionic, or nonionic surfactants or nanoparticles. Anionic surfactants are preferred in some embodiments. Surfactants may be selected from alkyl sulfates, alkyl ether sulfates, sulfonate fluorosurfactants, alkyl benzene sulfonates, alkyl aryl ether phosphates, alkyl ether phosphates, alkyl carboxylates, carboxylate fluorosurfactants, quaternary ammonium salts, amino acids, betaines, sultaines, fatty alcohols, polyoxyethyleneglycol alkyl ethers, glucoside alkyl ethers, polyoxypropylene glycol alkyl ethers, polyoxyethylene glycol octylphenol ethers, polyoxyethylene glycol alkyllphenol ethers, glycerol alkyl ethers, polysorbates, sorbitan alkyl esters, and poloxamers. Preferred surfactants are sodium dodecyl sulfate, dodecylbenzene sulfonate sodium salt, cetyl pyridinium chloride, and Triton X-100.

In some embodiments, the emulsifer is a high-molecular-weight polymer such as poly(vinyl pyrolidone), poly(vinyl alcohol), poloxamers, carboxymethyl cellulose, hydroxypropyl cellulose, poly(acrylic acid), or poly(ethylene glycol).

In some embodiments, the emulsifier is a Pickering agent. For example, reference is made to Hermant et al., "Conductive Pickering-poly(high internal phase emulsion) composite foams prepared with low loadings of single-walled carbon nanotubes," *Chem. Commun.*, 2009, 2738-2740. Hermant et al. is incorporated by reference herein for its teachings of Pickering emulsions stabilized by nanoparticles or nanotubes.

The amount, composition, and properties of the dispersed phase will dictate the overall morphology of the metal foam. For example, viscosity of the dispersed phase affects the cell dimensions. The cell dimensions in the metal foam may be adjusted by changing the dispersed-phase fluid viscosity, where higher-viscosity fluids result in larger cells.

Generally speaking, the dimensions of the metal-foam cells are dictated primarily by the chemical composition and properties of the dispersed phase, while the dimensions and propensity of the pores in the cell walls are dictated primarily by the amount of dispersed phase present. The cell and pore dimensions are therefore separately adjustable in the metal foam.

In preferred embodiments, the continuous phase is interconnected through the emulsion and the dispersed phase forms droplets, some or all of which are abutted. Certain emulsions that may be utilized are high-internal-phase emulsions, or HIPEs, which are defined as "emulsions in which the droplet phase occupies greater than 74.05% of the emulsion volume, this figure representing the maximum volume occupiable by uniform spheres" (Barbetta et al., "High internal phase emulsions (HIPEs) containing divinylbenzene and 4-vinylbenzyl chloride and the morphology of the resulting PolyHIPE materials," *Chem. Commun.*, 2000, 221-222). These emulsions can form stable templates and have droplets packed densely enough that they contact their neighbors. The result is that there will be windows between cells templated by the dispersed-phase droplets due to the areas where droplets are pressed against one another, which adds to the porosity of the final metal foam, including the creation of pores.

In some embodiments, the templating emulsion is synthesized in a laboratory blender or high-shear mixer. The emulsion may also be formed by mechanically or magnetically stirring two phases until they form one phase; this technique will result in a broader droplet-size distribution and thus a broader cell size distribution in the metal foam. If a narrower cell size distribution is desired, the dispersed-phase droplets may be fabricated using a microfluidic setup which typically produces extremely uniform droplets in the continuous phase.

To deposit the metal ions from the emulsion to a surface, some form of deposition from the metal-ion solution may be employed. Deposition methods include electroplating, electrophoretic deposition, underpotential deposition, and electroless deposition.

In some embodiments, electroplating is employed to produce the metal foam. The walls of the metal foam are made from metal particles, which themselves are formed through reduction of metals in the electroplating solution. The metals are electroplated through the continuous phase onto a conductive substrate (generally, the second metal layer). Possible electrochemical techniques include galvanostatic, potentiostatic, cyclic-voltammetric, and pulse-current techniques. The particle size and surface morphology of the electrochemically plated metal foam can be controlled by varying the current, voltage, scan rates, and/or the time.

Some embodiments employ electroless deposition of metals. Electroless deposition, also known as chemical or auto-catalytic plating, is a non-galvanic deposition method that involves several simultaneous reactions in an aqueous solution, which occur without the use of external electrical power. A negative charge is achieved on the surface by chemical, rather than electrical, means. For example, when hydrogen is released by a reducing agent, such as sodium hypophosphite, a negative charge is produced on the surface. The metals are then deposited through the continuous phase onto the surface to produce the metal foam.

In other embodiments of the invention, the metal foam may be produced starting from an aerogel template, such as (but not limited to) carbon aerogels. In these embodiments, the templating emulsion includes a polar aerogel precursor solution as the continuous phase, and one or more non-polar fluids as the dispersed phase. The aerogel precursor solution is mixed with an emulsifier and blended with an organic fluid to form an uncured foam. The uncured foam may be spread on a surface or filled in a mold, for example. The uncured foam may be cured by solidifying the aerogel template. Then, both the dispersed phase and the polar fluid in the aerogel are removed. The aerogel template may optionally be heated at elevated temperature to alter the aerogel properties.

A layer of one or more metals may then be deposited onto the aerogel template, using electroplating or electroless deposition, for example. Any of the metals and dimensions previously described may be utilized to deposit metals onto the aerogel template. After deposition of metals, the original aerogel template may then be removed, at least in part, leaving the metal foam. Removal of the aerogel template may be accomplished by chemical, thermal, electrical, and/or other means. For example, when the aerogel template is a carbon aerogel, the carbon may be removed through carbon oxidation to carbon oxides which leave as vapor. When the aerogel template is another type of aerogel, such as indium tin oxide aerogels, tungsten oxide aerogels, ruthenium oxide aerogels, or antimony tin oxide aerogels, the aerogel may be removed through chemical reactions at suitable conditions. The remaining metal will form a metal foam consisting of cells with porous metal walls.

Some embodiments are premised on the realization that the emulsions are typically viscoelastic fluids. The structure and relative position of emulsion droplets can therefore shift during the growth of the metal in the continuous phase upon deposition. In order to decrease disruption of the emulsion network during deposition, it may be desirable to crosslink the dispersed-phase droplets. When such crosslinking is desired, a preferred technique for crosslinking utilizes hydrosilation chemistry. In some embodiments, suitable catalysts, such as platinum-based catalysts, can covalently bond polysiloxane species containing vinyl and hydrosilyl groups. Crosslinking can take place within discrete droplets as well as between droplets, to create a static or at least more-stable emulsion structure. This technique can also result in a much higher viscosity of the dispersed-phase droplets in the emulsion.

Additional methods that may be employed can be found in Gross and Nowak, "Hierarchical Carbon Foams with Independently Tunable Mesopore and Macropore Size Distributions," *Langmuir* 26(13), 11378-11383 (2010), which is hereby incorporated by reference herein in its entirety for all purposes.

Some variations of the invention provide a battery comprising an electrode that includes an electrically conductive metal foam, with the pores of the metal foam containing an active energy-storage material. The electrically conductive metal foam may be fabricated and characterized in accordance with the description of embodiments herein. The open-cell configuration of the metal foam improves the filling of the energy-storage material within the pores of the foam.

Preferably, the metal foam is structurally continuous with a base metal layer that can conduct electrons into and out of the battery. Electrodeposition (e.g., electroplating) of metal ions, as described above, allows for the fabrication of a structurally continuous interface between the base metal layer and metal foam. The result is a one-piece structure where the current-collecting metal foam is the same piece of metal as the back foil (or other metal layer) used to transport electrons into and out of the battery.

In battery variations, the energy-storage material contained within the pores of the metal foam may be selected from oxides of iron, manganese, cobalt, or nickel, or from ternary oxides of lithium plus iron, manganese, cobalt, or nickel. For example, the energy-storage material may be an oxide selected from the group consisting of $Fe_2O_3$, $MnO_2$, $LiMnO_2$, $Mn_2O_3$, $LiMn_2O_4$, CoO, $LiCoO_2$, $SnO_2$, SiO, $Cr_2O_3$, NiO, $RuO_2$, and $VO_x$, wherein x is selected from 1 to 2.5.

When the electrode provided by the present invention is employed as a cathode, exemplary cathode energy-storage materials include, but are not limited to, $LiMO_2$ (M=Co, Ni, Mn, or combinations thereof); $LiM_2O_4$ (M=Mn, Ti, or combinations thereof); $LiMPO_4$ (M=Fe, Mn, Co, or combinations thereof); and LiM$_x$M'$_{2-x}$O$_4$ (M, M'=Mn or Ni); or other lithium metal oxides, phosphates, or silicates.

When the electrode provided by the present invention is employed as an anode, exemplary anode energy-storage materials include, but are not limited to, carbon materials such as graphite, coke, soft carbons, and hard carbons; and metals such as Si, Al, Sn, or alloys thereof; titanium oxides, germanium, copper/tin, and lithium compounds containing metal oxides, such as oxides of W, Fe, and Co.

Some embodiments relate to lithium-ion batteries, which will include a liquid electrolyte to conduct lithium ions. The liquid electrolyte acts as a carrier between the cathode and the anode when the battery passes an electric current through an external circuit. The electrolyte generally includes a solvent and a lithium salt (anion plus lithium cation). Lithium salts include, but are not limited to, LiClO$_4$, LiBF$_4$, LiPF$_6$, LiCF$_3$SO$_3$, LiCF$_3$CO$_2$, LiAsF$_6$, LiSbF$_6$, LiAlCl$_4$, LiCl, LiBr, and LiI, which may be used alone or as a mixture of two or more. Examples of the solvent that can be used include aprotic organic solvents, such as ethylene carbonate. As is known in the art, other minor components and impurities can be present in the electrolyte composition.

Some variations of this invention enable batteries with improved energy density as well as improved power density. In contrast to current conventional battery electrodes, electrodes in some variations of this invention form a conductive matrix to significantly reduce the internal resistance and enable much thicker electrodes. The metal foam can potentially increase the active materials loading to 3-10× of the loading in conventional battery electrodes, and reduce or eliminate the need for conductive particles (such as carbon particles) and binders, in the electrode. Additionally, metal foams with smaller possible pore sizes have thinner walls and lower mass, which further improves battery energy density.

The increased conductivity of metals such as copper reduces the IR drop in the battery electrode, compared to carbon, for example. In addition, there are no preferably discontinuous interfaces present to create IR drops at the junction of the porous metal foam and the underlying solid support (second metal layer). This is in contrast to electrode designs using a metal foam physically pressed against the back foil. The lower IR drop across the electrode results in faster charging and discharging kinetics for the battery.

The structure of the metal foam offers particular benefits. A large amount of energy-storage material can be held by the metal foam in the electrode due to the large pore volume. The structure reduces the mass of the foam, which improves energy density. Furthermore, the cells (largest pores) in the foam in the electrode have smaller pores (openings) between cells to improve filling of energy-storage materials and to improve ion diffusion during electrochemical cycling. The porous nature of the metal foam will provide conduits to allow Li ions, for instance, to penetrate in and out of the energy-storage material and increase power output.

In addition, the metal foam provides electrical connections to substantially all of the energy-storage material contained in the pores. The small (and adjustable) pore size decreases the transport distances for electrons to reach the metal foam from the energy-storage material in an electrode. Thus, carrier conduction may be improved and greater power densities are possible. The continuous metallic nature of the foam also helps to more efficiently remove heat from the battery through the electrode, improving battery cooling.

A battery preferably includes a one-piece structure where the current-collecting metal foam is the same piece of metal as the back foil used to transport electrons into and out of the battery. This prevents delamination of battery material (from volume expansion driven by chemical intercalation) and the resulting loss of capacity or lifetime. Furthermore, this structure reduces the electrical resistance of the electrode and faster battery cycling may be realized.

In some embodiments, the battery can be packaged into either prismatic format cells or cylindrical cells. In the prismatic format, the stacked structure is preferably sealed with a packaging material capable of preventing air and water contamination of the battery.

Some variations of the invention provide a fuel cell comprising an electrode that includes an electrically conductive metal foam, wherein the pores allow fluid transport of one or more gases, liquids, or dissolved ions in the fuel cell. The open-cell configuration of the metal foam improves mass transport of species throughout the metal foam in the electrode. The electrically conductive metal foam may be fabricated and characterized in accordance with the description of embodiments herein.

The metal foam may include one or more metals that are catalytically active for at least one fuel cell reaction. Alternatively, or additionally, the metal foam may further comprise one or more catalysts supported on the metal foam. The catalyst particles or catalyst film may be loaded onto the metal-foam structure using catalyst-deposition techniques known in the art. Exemplary catalyst materials suitable for fuel cells include, but are not limited to, Pt, Co, Cu, Zn, Al, Mo, Se, Ti, V, Mn, Cr, Fe, Ni, Cu, Zn, Sn, Ru, Ta, Nb, Os, Bi, Rh, W, Pb, Au, Pd, and combinations and alloys thereof. An electrode with a catalytic metal foam may be either the cathode or the anode in the fuel cell.

In some embodiments, a fuel cell includes an anode with a metal foam according to the present disclosure. An anode catalyst may be selected from platinum (Pt), platinum-tin (Pt—Sn), and/or platinum-ruthenium (Pt—Ru), any of which can be supported (e.g., on carbon) or unsupported, and optionally mixed with a binder. The anode catalyst may include other platinum-group metals, such as palladium or rhodium, and may be present in free or combined form, such as in metal alloys, oxides, carbides, etc. An anode catalyst layer can be cast from a mixture of isopropanol and platinum, using a Teflon® slurry, for example.

In some embodiments, a fuel cell includes a cathode with a metal foam according to the present disclosure. A cathode catalyst may be selected from Pt, Pt—Sn, and/or Pt—Ru (optionally supported on carbon, and optionally mixed with a binder). The cathode catalyst may include other platinum-group metals, such as palladium or rhodium, and can be present in free or combined form, such as in metal alloys, oxides, carbides, etc.

Fuel cells utilizing the principles of this invention are suitable for a wide variety of fuels. An exemplary list of fuels is hydrogen, syngas, methanol, ethanol, 1-propanol, isopropanol, 1,3-propanediol, 2,4-pentanediol, formic acid, hydrocarbazole, and alkylated hydrocarbazole. Essentially any hydrocarbons, including oxygenates, alkanes, olefins, aromatics, and heterocyclic compounds, may be employed.

The range of cell and pore sizes in the metal foam can be tailored to improve gas, liquid, and dissolved-ion transport through the electrode. The large pore volume and high surface area of the foams in the electrodes allow gasses and liquids to penetrate throughout and improve their reaction rate across the electrode. Fuel utilization is expected to benefit from higher reactive surface areas and reduced mass-transfer distances.

Some variations of the invention provide fuel cells with improved power density, due to the ability to fabricate thicker electrodes. The nature of the metal foam reduces weight and improves its mechanical strength when it is compressed against the membrane in a fuel cell. The conducting metal foam, in contrast to agglomerated carbon particles in known fuel cell electrodes, improves electrical conductivity and allows thicker electrodes, and thus higher power density.

Preferably, the metal foam is structurally continuous with a base metal layer that can conduct electrons out of the fuel cell. In these embodiments, the current-collecting foam is the same piece of metal as the back metal foil (or other layer) in the electrode, which reduces the electrical resistance of the fuel cell. Lower electrical resistances result in greater power output.

Certain embodiments of the invention will now be further described with reference to the examples, which by no means should be construed to limit the invention.

Example 1

In this Example 1, an open-cell copper foam is formed on a copper foil by electroplating in a templating emulsion surrounding the foil.

The templating emulsion is formed by first making 1 M $H_2SO_4$ in Transene Electroless Cu Part A solution containing $CuSO_4$ (Transene Company, Danvers, Mass., US). 12.5 g of the acidic $CuSO_4$ solution is mixed with 0.360 g sodium dodecylbenzensulfonic acid surfactant and vortex-stirred until homogeneous. Then a commercially available silicone oil (Part No. VDT-123, Gelest, Inc., Morrisville, Pa., US) with a viscosity of 250-350 cSt and 1 drop of Pt catalyst dispersed in vinyl-terminated PDMS (Gelest Part No. SIP6830.3) are added to a blender and blended on low speed for 45 seconds. Next the aqueous phase is added to the blender and the contents of the blender are mixed for 10 minutes. The emulsion is allowed to rest for 8 hours to polymerize the silicone oil.

The electrochemical experiments are carried out in a two-electrode cell, using a Solartron 1287A potentiostat. A 2-mil-thick Cu foil serves as both the cathode (working electrode) and the anode (counter electrode) for electroplating. Prior to electroplating, the Cu is cleaned by 0.5 M $H_2SO_4$ and then is rinsed with DI water. The electroplating solution is the emulsion prepared using the method described above. A galvanostatic technique is used to electroplate copper onto the Cu foil substrate. 2 mA current is used for 16 hr.

Figure 1B:
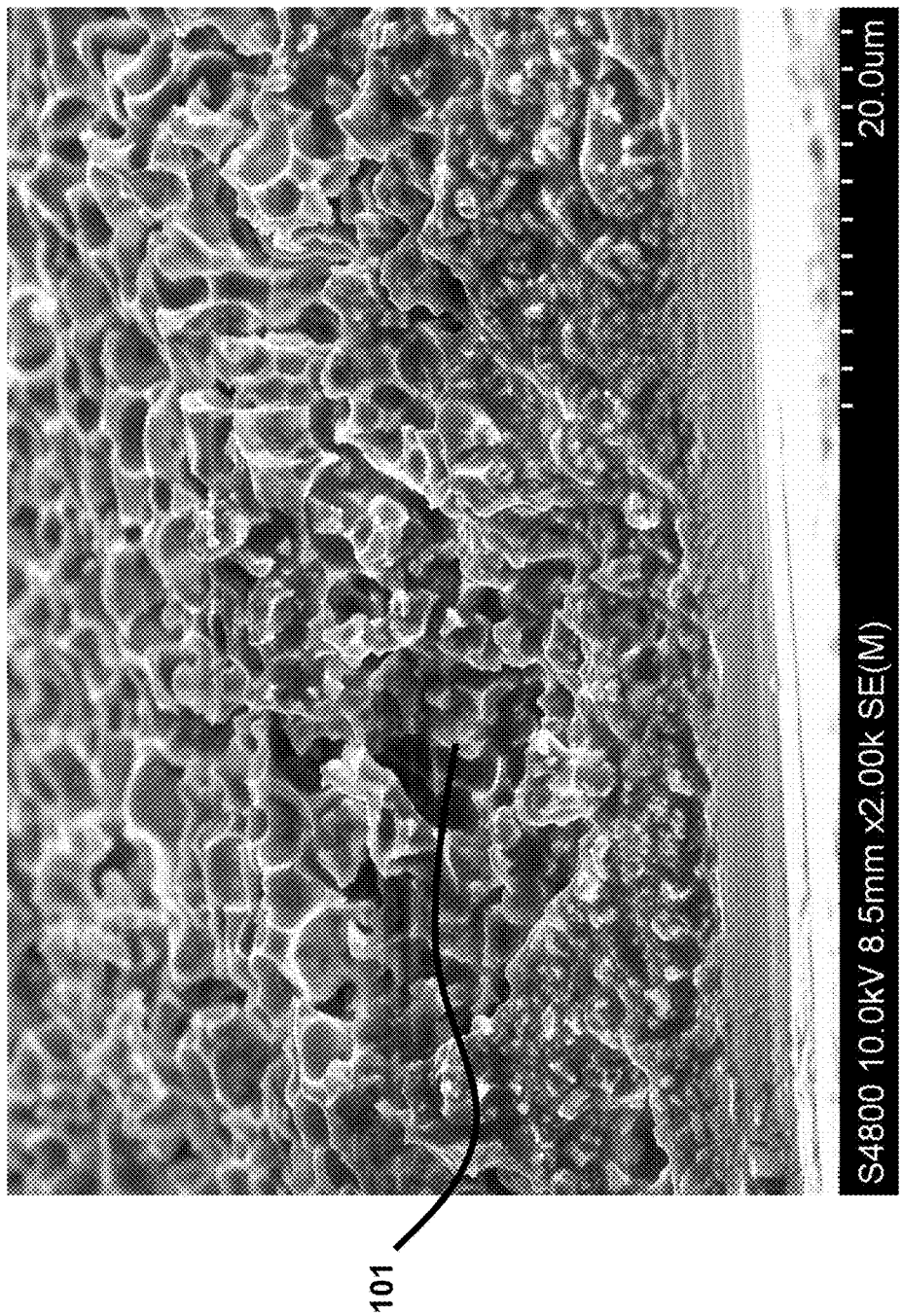
FIG. 1B shows a side view of a metal foam that is about 35 µm thick.
Figure 1C:
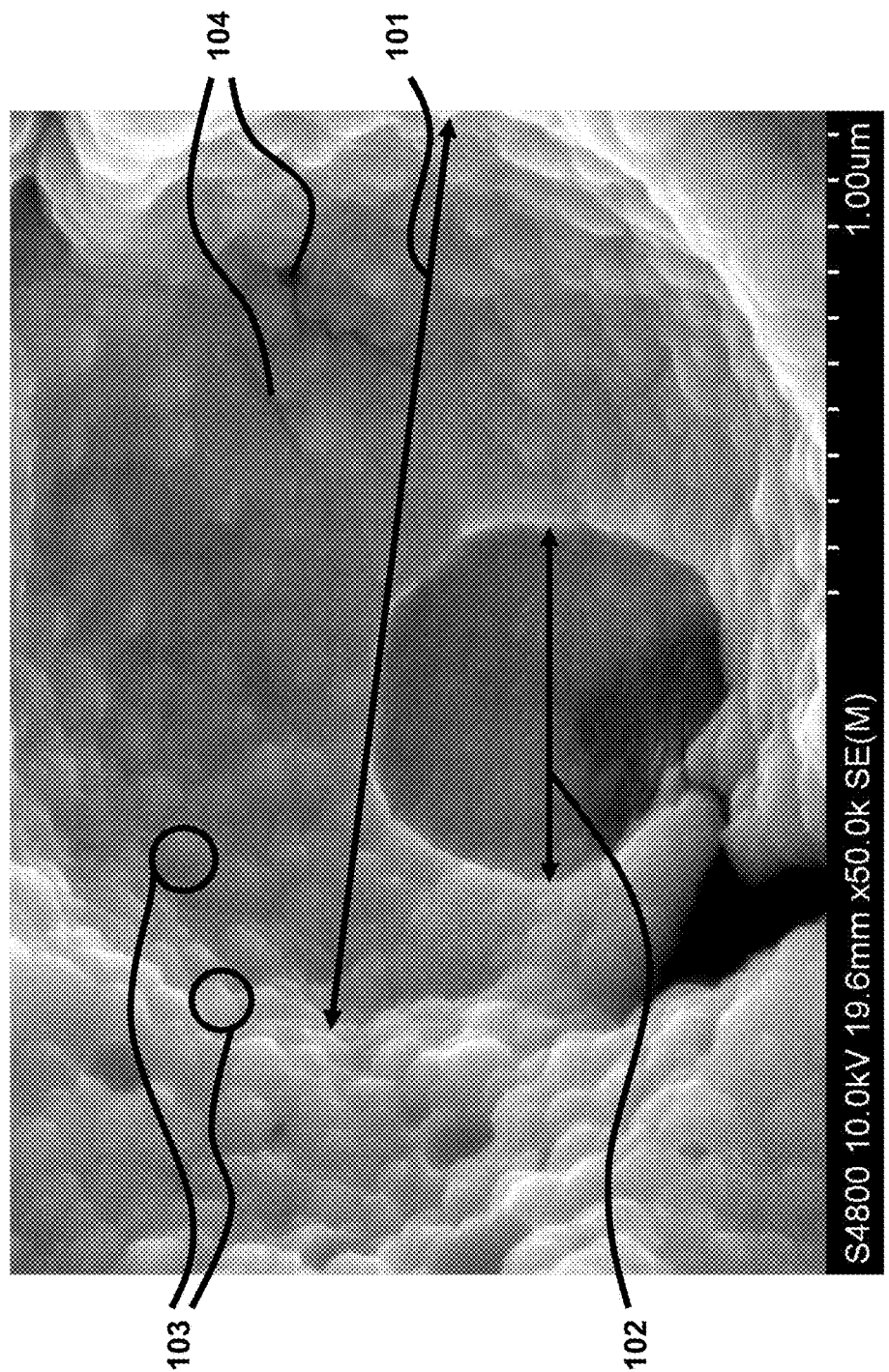
FIG. 1C shows an SEM image revealing sintered copper particles in a metal foam, in some embodiments.

In FIGS. 1A, 1B, and 1C, SEM images of the electroplated Cu foam are shown. Scale bars are on the images. The SEM image in FIG. 1A shows cells 101 templated by oil droplets with cell windows (pores) 102 between adjacent pores formed by abutted droplets. The dimensions shown in FIG. 1A reveal an electrically conductive metal foam comprising cells and pores, wherein the cells have an average cell diameter of 25 μm or less, and wherein the pores have an average pore size less than the average cell diameter.

The SEM image in FIG. 1B is a side view of the foam showing that it is ~35 μm high. A cell 101 is indicated, and a porous-foam structure persists throughout. The SEM image in FIG. 1C reveals copper particles 103 that are sintered together, with micropores 104 between sintered particles. Sintered particles make up the pore walls. There are multiple types of pores present, including micropores between particles, pores between cells, and cells.

The surface area of the film is also analyzed using an electrochemical method by quantifying the surface capacitance. Prior to the surface area characterizations, the Cu foam is cycled at 200 mV/s for 2 cycles using cutoff voltage at 3 V and 0.2 V to remove the surface oxides. Then the Cu foam is cycled at 200 mV/s for 50 cycles with a cutoff voltage at 2.5 V and 1.0 V (vs. Li/Li$^+$), followed by cycling at 100, 50, 20, and 10 mV/s of 5 cycles each.

The electrochemical experiments are then carried out in a three-electrode cell, using a Solartron 1287A potentiostat. The working electrode is the Cu foam. Lithium metal is used for both the counter and reference electrode. The electrolyte is 1 M $LiPF_6$ in 1:1 (v/v) ethylene carbonate/dimethyl carbonate solution. The experiments are performed in an Ar-filled glove box. A cyclic-voltammetry technique is used for the surface area analysis.

Figure 2A:
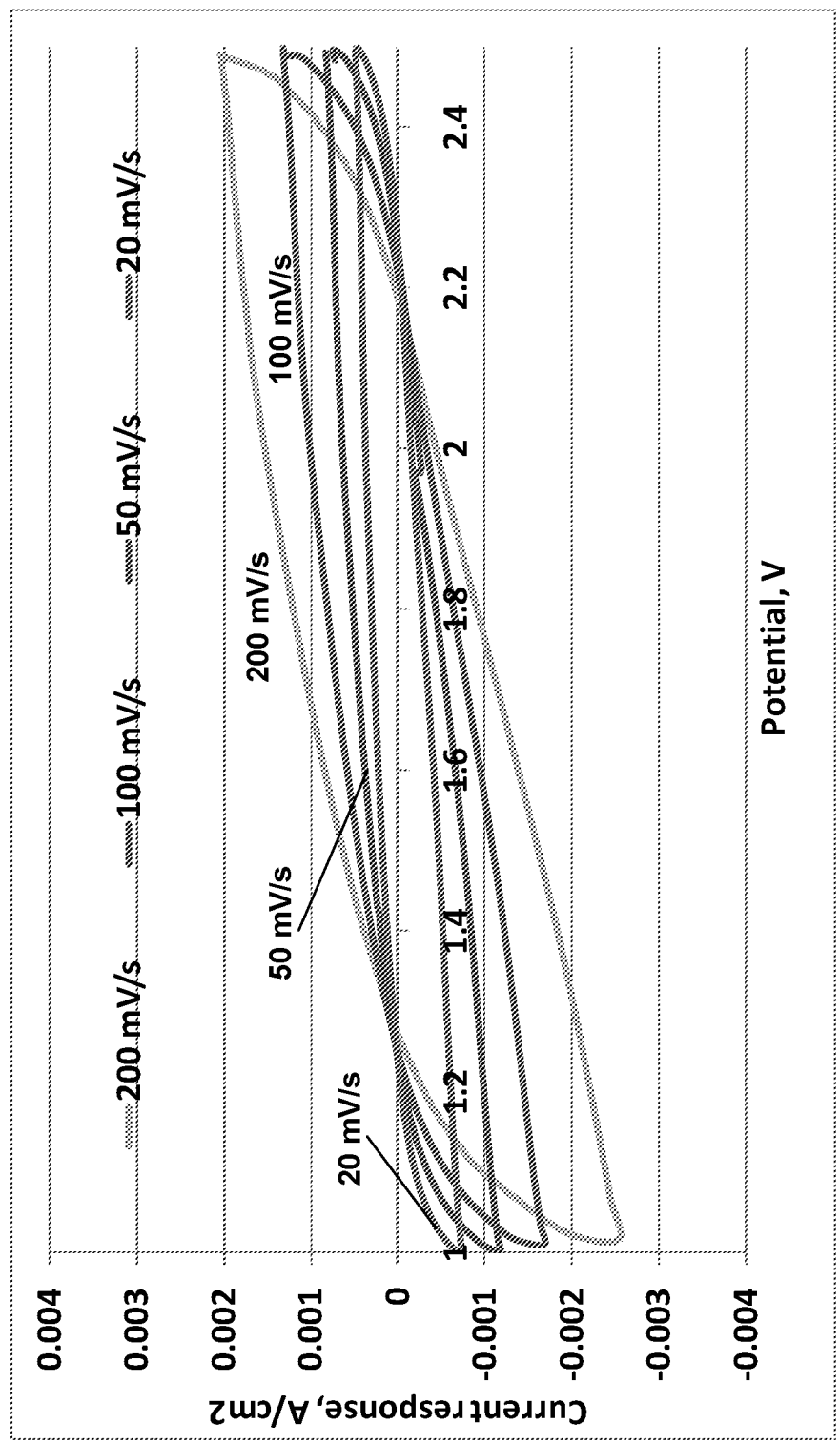
FIG. 2A illustrates cyclic-voltammetric response curves of a copper metal foam at various scan rates.
Figure 2B:
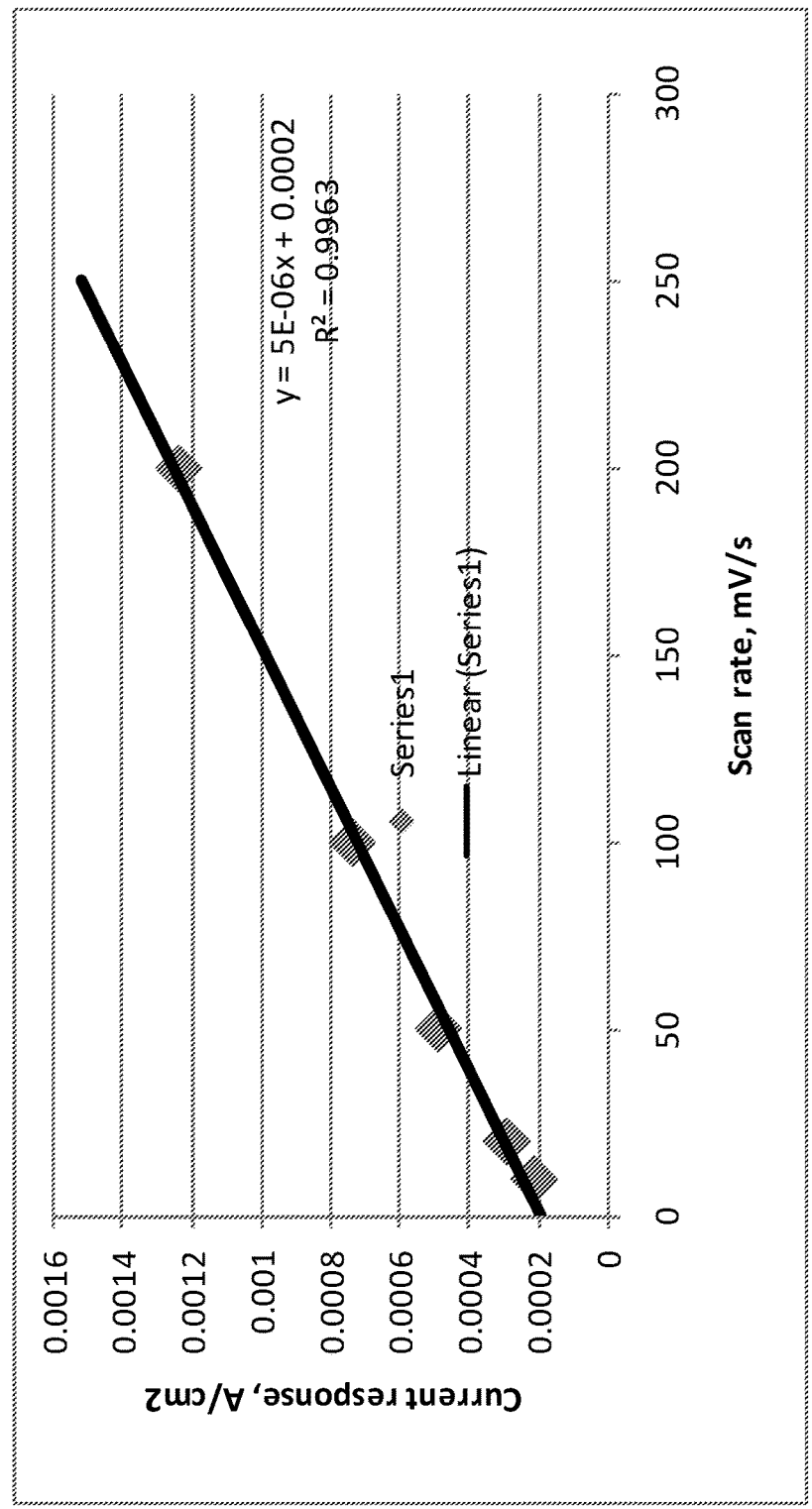
FIG. 2B summarizes current responses as a function of scan rates for a copper metal foam of some embodiments.
Figure 2C:
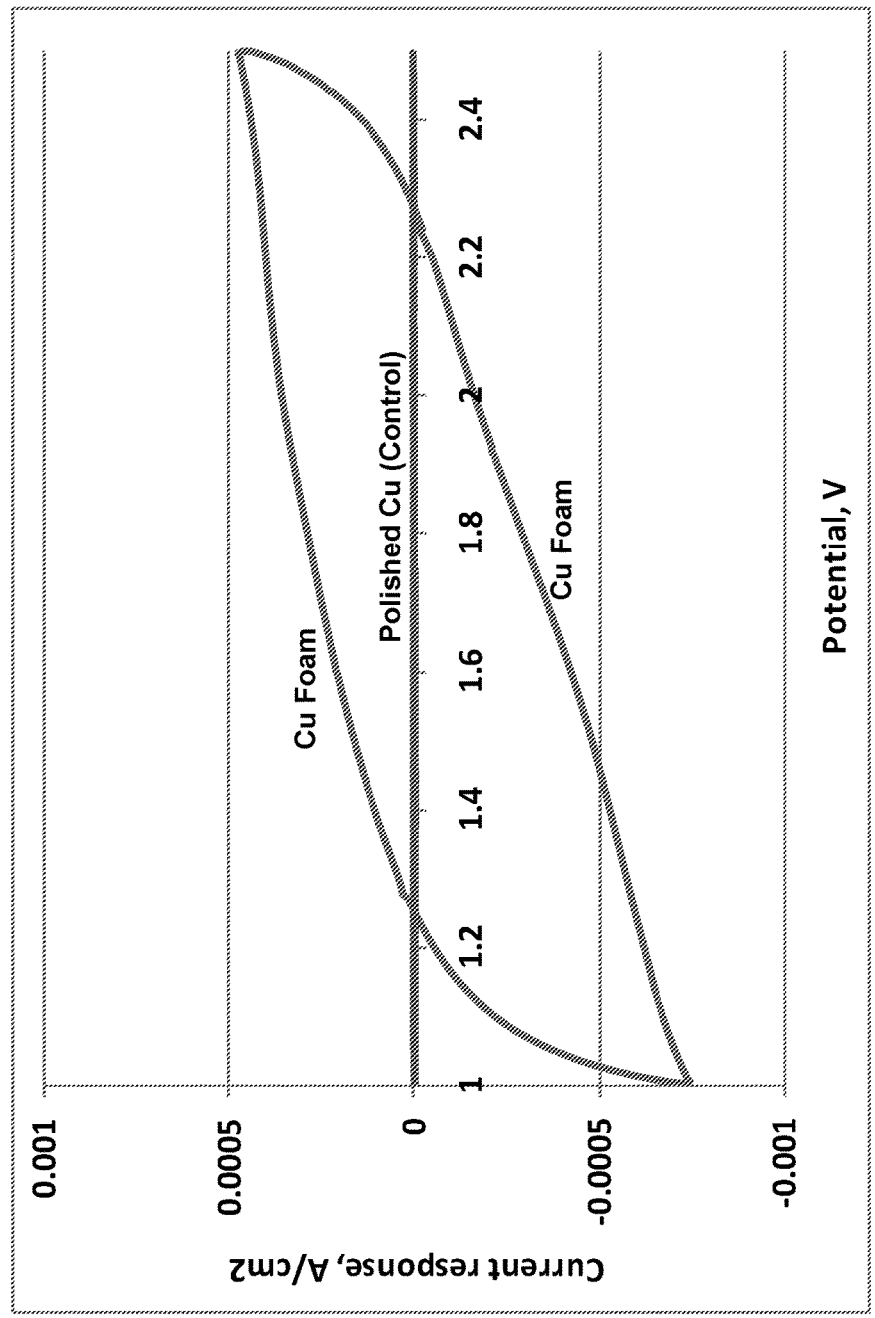
FIG. 2C compares the cyclic voltammetric responses at 20 mV/s between the copper foam and a polished copper foil at the same projected surface area.

The cyclic-voltammetric response of the Cu foam is shown in FIG. 2A, which shows response curves of the foam at scan rates 200, 100, 50 and 20 mV/s. For comparison, a polished Cu foil with a known surface area is also recorded as a control. The characteristic featureless rectangular-shaped curves represent the capacitive effect only at the surface of the Cu foam without any diffusion-limited redox reactions. This was further confirmed by plotting the current response as a function of the scan rates as shown in FIG. 2B. The linear relationship indicates that the charge storage is mainly contributed from the capacitive effect at the surface. FIG. 2C shows a comparison of cyclic voltammetric responses (at 20 mV/s) between the Cu foam and a polished Cu foil at the same projected surface area of 1 cm$^2$. For a 30-μm thick Cu foam, the roughness factor is above 150. That is, the current response of Cu foam is 150× larger than the current response of the polished Cu surface. The calculated surface area is 2.3 m$^2$/g.

Example 2

In this Example 2, an open-cell copper foam is formed on a copper foil by electroplating in a templating emulsion surrounding the foil.

The templating emulsion is formed by first making 1 M $H_2SO_4$ in Transene Electroless Cu Part A solution that contains $CuSO_4$. 12.5 g of the acidic $CuSO_4$ solution is mixed with 0.360 g sodium dodecylbenzensulfonic acid surfactant, vortex-stirred until homogeneous, and poured into a Waring laboratory blender. Then 37.5 g of Dow Corning 200 silicone oil, with a viscosity of 100 cP, is added to the blender. The contents of the blender are mixed for 10 minutes.

Prior to electroplating, the Cu is cleaned by 0.5 M $H_2SO_4$ and then rinsed with DI water. The electroplating solution is the templating emulsion prepared using the method described in this Example 2. The electrochemical experiments are carried out in a two-electrode cell, using a Solartron 1287A potentiostat. The 2-mil-thick Cu foil serves as both the cathode (working electrode) and the anode (counter electrode) for electroplating. Galvanostatic electrodeposition is used to electroplate copper onto the Cu foil substrate. A current of 1 mA current is employed for 2 hr.

Figure 3A:
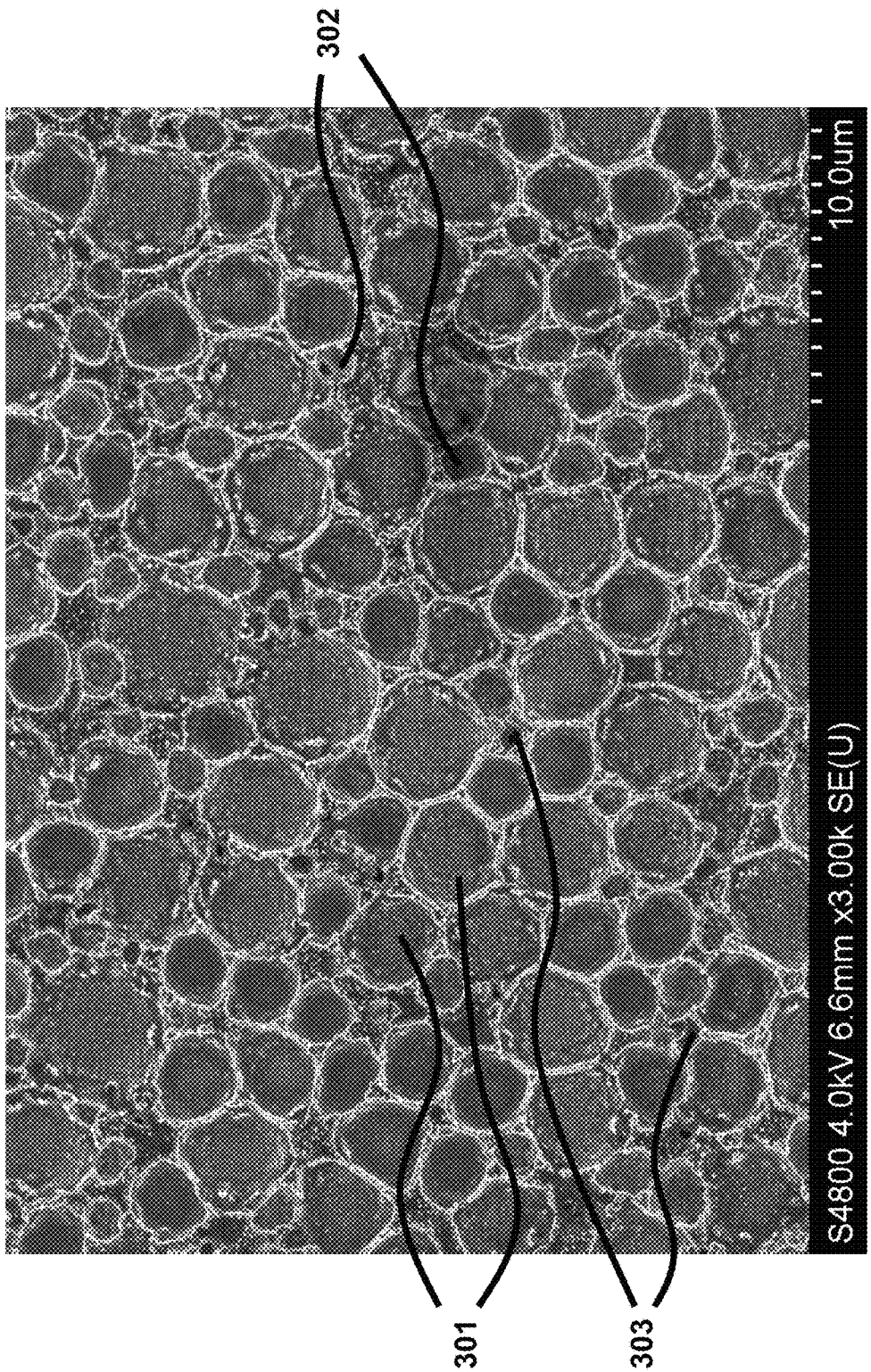
FIG. 3A shows an SEM image illustrating cells templated by silicone oil droplets in an open-cell copper foam.
Figure 3B:
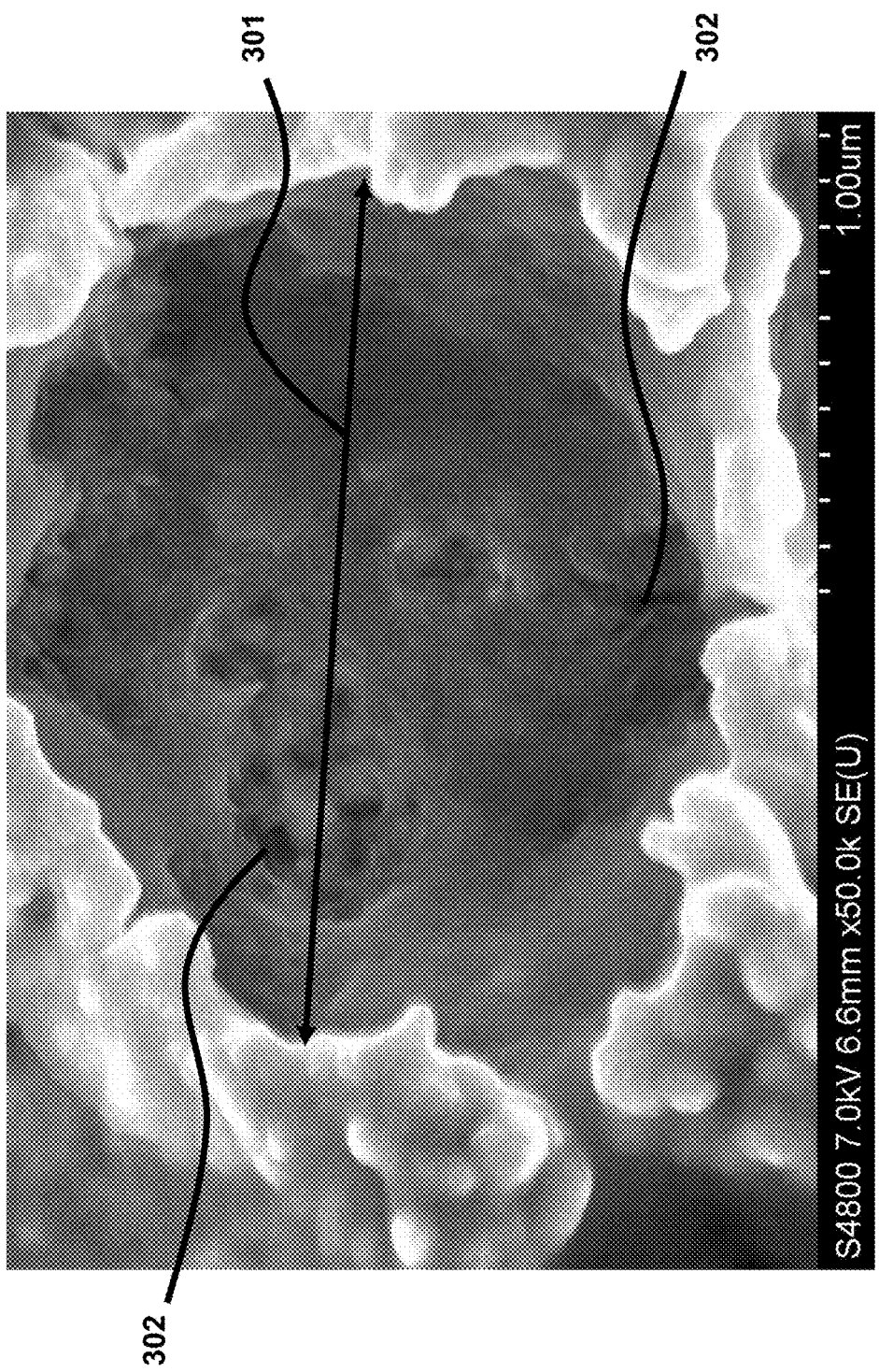
FIG. 3B shows a magnified SEM image of a pore of a copper foam.

In FIGS. 3A and 3B, SEM images of the electroplated Cu foam are illustrated. Scale bars are on the images. FIG. 3A shows an SEM image illustrating cells 301 templated by silicone oil droplets, pores 302 between adjacent cells, and open cells 303. FIG. 3A demonstrates an electrically conductive metal foam comprising cells and pores, wherein the cells have an average cell diameter of less than 10 μm. FIG. 3B is a magnified image of a pore of the Cu foam, revealing a cell 301 and pores 302.

There are openings between the cells. The openings allow greater penetration of liquid and gasses for fuel cell operation as well as better filling of battery materials. The thickness of the foam on the Cu foil is measured to be 10 µm. The thickness can be increased or decreased by changing the electroplating current or time.

Example 3

In this Example 3, a Cu foam is formed with larger cells from a higher-viscosity emulsion.

The templating emulsion is formed by first making a 1 M $H_2SO_4$ in Transene Electroless Cu Part A solution that contains $CuSO_4$. 12.5 g of the acidic $CuSO_4$ solution is mixed with 0.360 g sodium dodecylbenzensulfonic acid surfactant, vortex-stirred until homogeneous, and poured into a Waring laboratory blender. Then 37.5 g Dow Corning 200 silicone oil, with a viscosity of 1000 cP, is added to the blender. The contents of the blender are mixed for 10 minutes.

Prior to electroplating, the Cu is cleaned by 0.5 M $H_2SO_4$ and then rinsed with DI water. The electroplating solution is the templating emulsion prepared using the method described in this Example 3. The electrochemical experiments are carried out in a two-electrode cell, using a Solartron 1287A potentiostat. The 2-mil-thick Cu foil serves as both the cathode (working electrode) and the anode (counter electrode) for electroplating. Galvanostatic electrodeposition, with a 1 mA current for 2 hr, is used to electroplate copper onto the Cu foil substrate.

Figure 4:
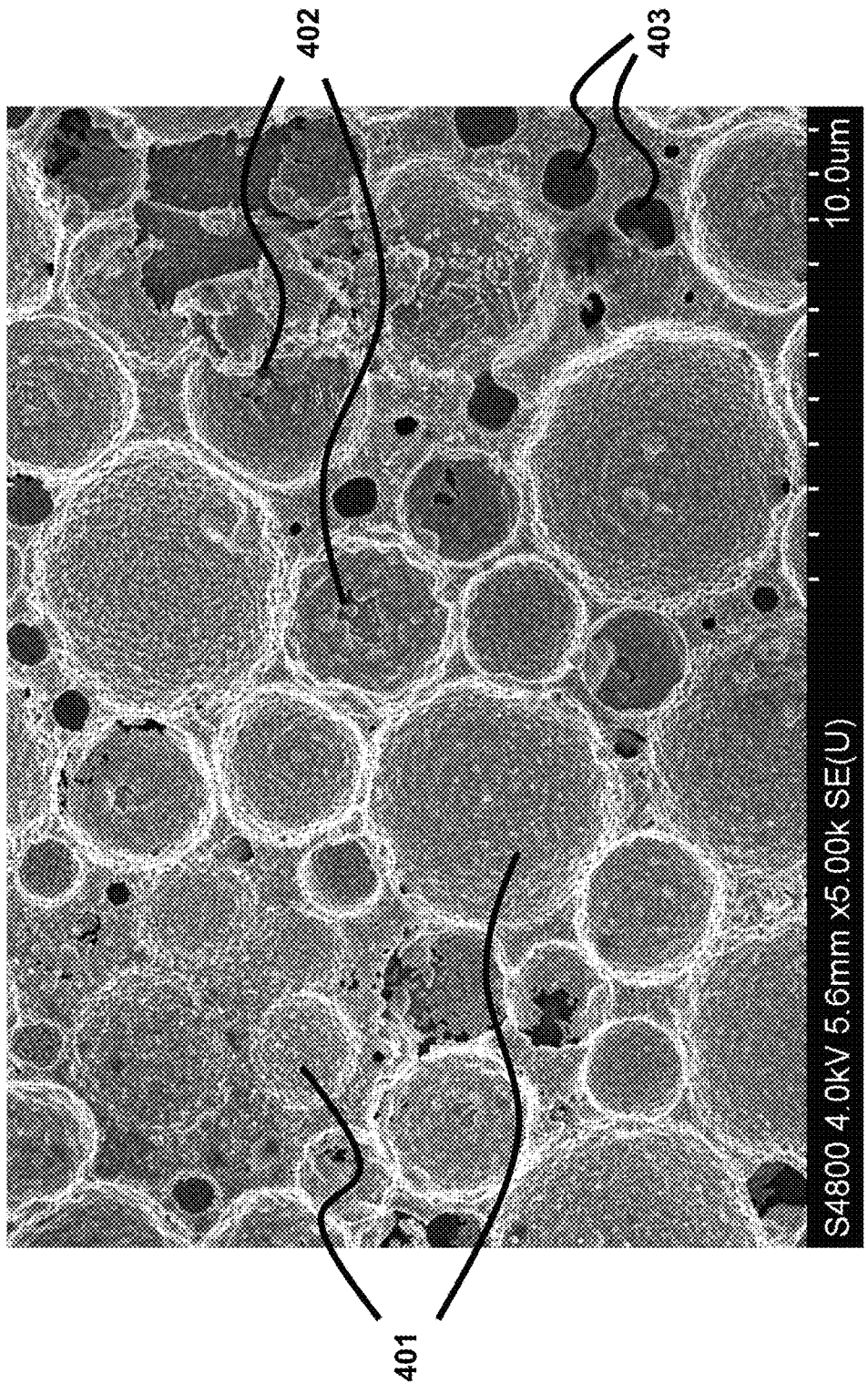
FIG. 4 shows an SEM image of a copper foam in some embodiments.

An SEM image of the Cu foam from this example is shown in FIG. 4. This image includes cells 401 templated by oil droplets, pores 402 between adjacent cells, and open cells 403. Sintered Cu particles make up the walls of the cells 401, as can be observed in the SEM image.

Figure 5A:
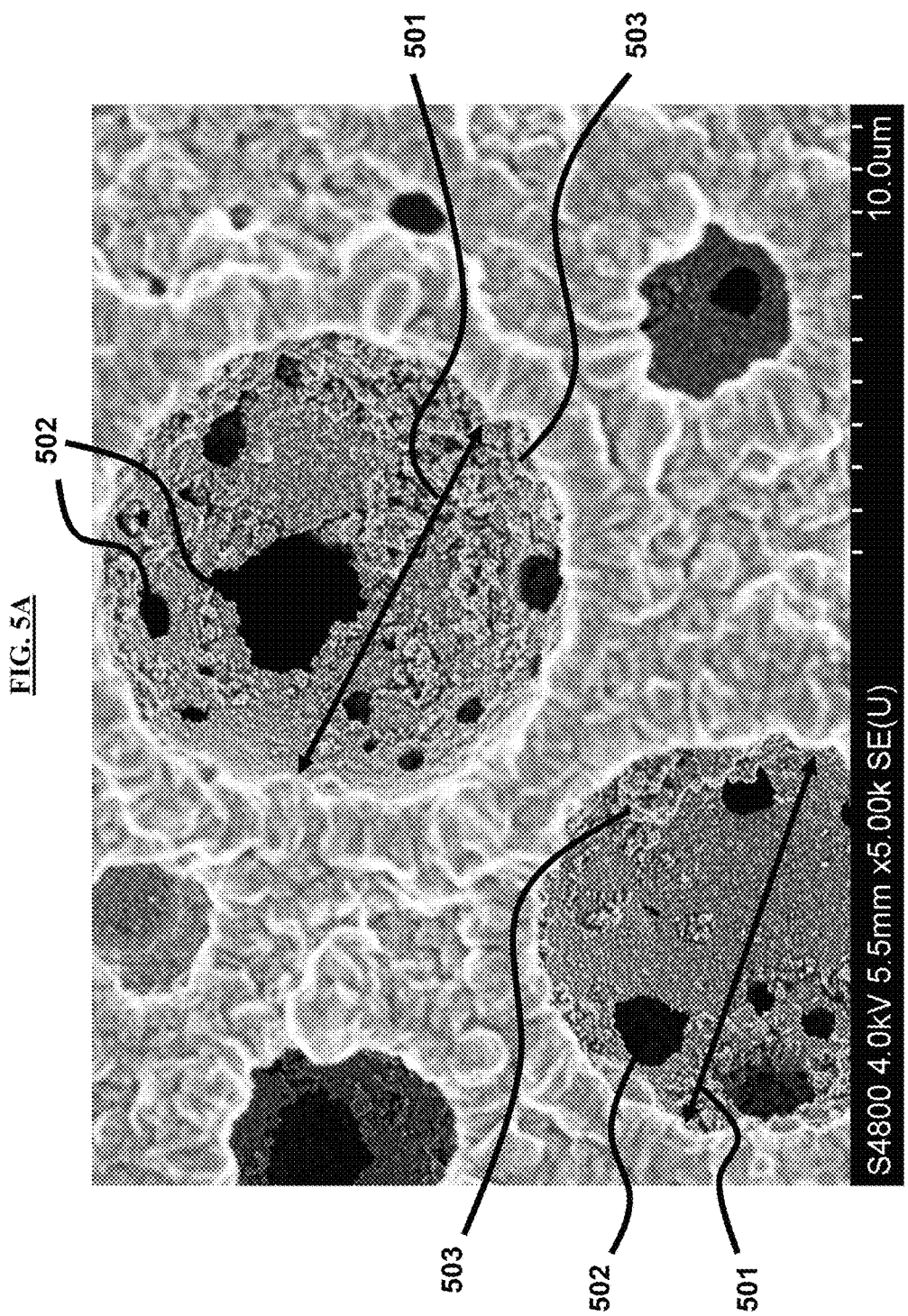
FIG. 5A shows an SEM image illustrating pores and cells.
Figure 5B:
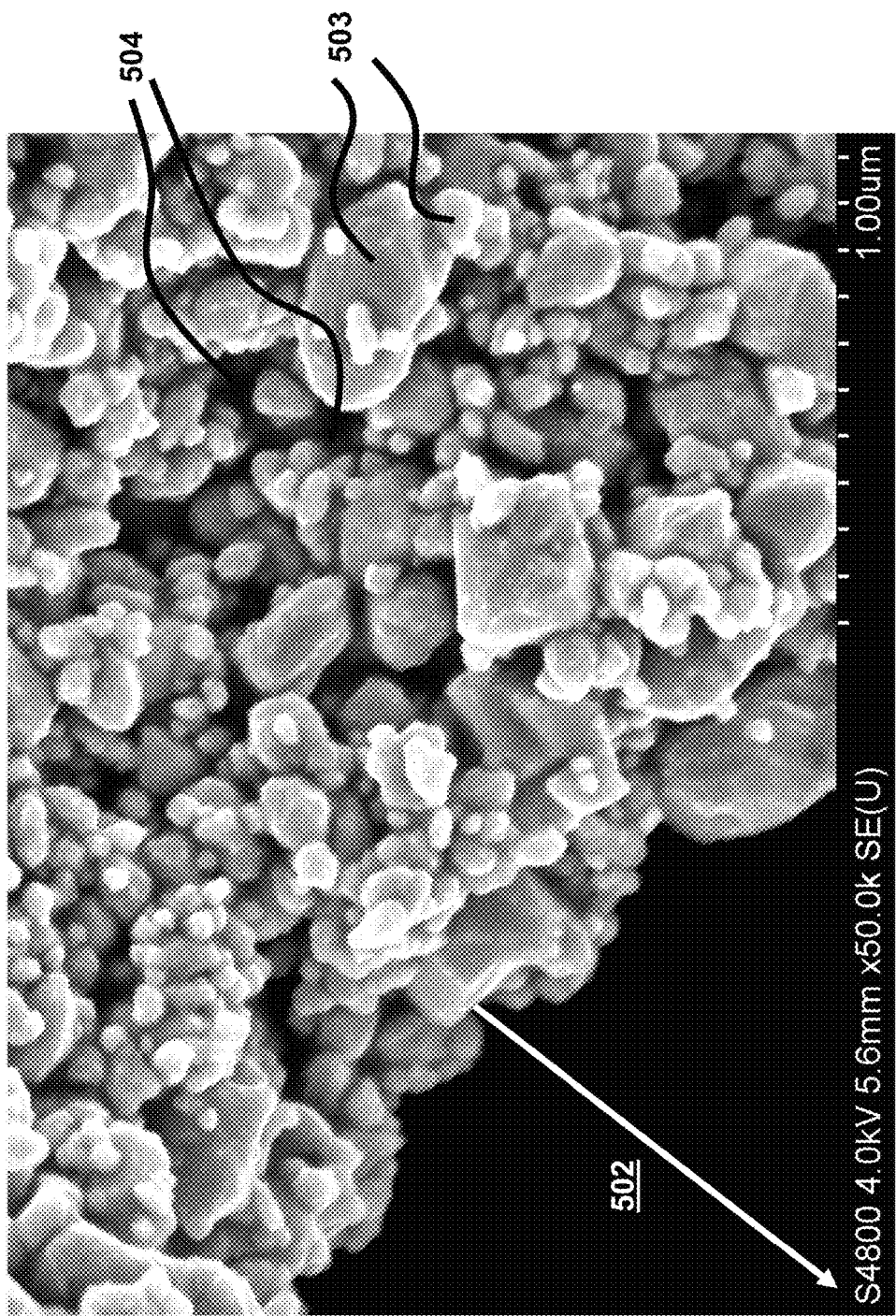
FIG. 5B shows an SEM image illustrating a structure of cell walls formed by smaller metal particles.

An open-cell foam is formed with significantly larger cells compared to the cell diameter formed when a lower-viscosity oil is used (Example 2, FIG. 3B). The SEM image in FIG. 5A shows cells 501 templated by oil droplets, pores 502 between adjacent cells, sintered copper particles 503, and micropores 504 between sintered particles. The cell walls are formed by smaller metal particles. FIG. 5B is a higher-magnification SEM image revealing a pore 502, sintered copper particles 503, and micropores 504 between the particles.

This Example 3, and the accompanying figures, demonstrates a non-reticulated, electrically conductive metal foam comprising cells and pores, wherein the cells have an average cell diameter of less than about 10 µm.

Variations of this invention will allow faster charging and discharging batteries with longer lifetimes and greater power densities as well as greater power density fuel cells. There are various commercial, military, and aerospace applications of this invention in electrochemical devices, including batteries and fuel cells.

Applications for batteries include, but are not limited to, laptop computers, mobile phones, cameras, medical devices, electric vehicles, electric bikes, scooters, and power tools. Applications for fuel cells include, but are not limited to, small power plants, electric and hybrid vehicles, auxiliary power, off-grid power supply, battery back-up power, notebook computers, and portable electronics.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of fabricating a non-reticulated, electrically conductive metal foam, said method comprising:
    (a) receiving a metal-ion solution comprising a polar solvent and at least one selected metal ion or salt thereof;
    (b) receiving at least one non-polar fluid;
    (c) combining said metal-ion solution with said non-polar fluid to form an emulsion, wherein said metal-ion solution is a continuous phase and said non-polar fluid is a dispersed phase of said emulsion; and
    (d) immersing a base metal layer into said emulsion under effective conditions for deposition of at least a portion of said metal ions onto said base metal layer, thereby forming said metal foam onto said base metal layer, wherein pore dimensions of said metal foam are templated by droplets contained in said emulsion.

2. The method of claim 1, wherein said metal-ion solution contains one or more metal salts selected from the group consisting of $CuSO_4$, $Cu(NO_3)_2$, $NiSO_4$, and $Ni(NO_3)_2$.

3. The method of claim 1, wherein said metal-ion solution contains one or more acids or bases selected from the group consisting of $H_2SO_4$, $HNO_3$, HCl, $Cu(OH)_2$, $Ni(OH)_2$, NaOH, KOH, and $NH_3$.

4. The method of claim 1, wherein said non-polar fluid is selected from the group consisting of a hydrocarbon, a fluorocarbon, a siloxane, and any combination thereof.

5. The method of claim 1, wherein said non-polar fluid includes silicone oil.

6. The method of claim 1, wherein said dispersed phase is about 50 wt % to about 99 wt % of said emulsion.

7. The method of claim 1, wherein said emulsion further includes an emulsifier selected from the group consisting of surfactants, high-molecular-weight polymers, and inorganic particles.

8. The method of claim 1, further comprising crosslinking said non-polar fluid to increase viscosity of said dispersed phase.

9. The method of claim 1, wherein said deposition is selected from the group consisting of electroplating, electrophoretic deposition, underpotential deposition, and electroless deposition.

10. The method of claim 1, comprising separately adjusting dimensions of cells and pores in said metal foam.

11. The method of claim 1, wherein said metal foam includes cells and pores, and wherein said cells have an average cell diameter of about 25 µm or less.

12. The method of claim 1, wherein said metal foam includes cells and pores, and wherein said pores have an average pore size of about 1 µm or less.

* * * * *